United States Patent
Smed

(10) Patent No.: US 7,316,377 B2
(45) Date of Patent: Jan. 8, 2008

(54) FLAT PANEL MONITOR MOUNT WITH LOW PROFILE BALL AND SOCKET SWIVEL AND TILTER MOUNT

(76) Inventor: Ole Falk Smed, 751 Dove Run Cir., Palm Desert, CA (US) 92211

( * ) Notice: Subject to any disclaimer, the term of this patent is extended or adjusted under 35 U.S.C. 154(b) by 81 days.

(21) Appl. No.: 11/338,071

(22) Filed: Jan. 24, 2006

(65) Prior Publication Data

US 2007/0170321 A1   Jul. 26, 2007

(51) Int. Cl.
*E04G 3/00* (2006.01)
(52) U.S. Cl. ............... 248/276.1; 248/176.1; 248/917; 248/919; 248/921; 361/681; 361/683
(58) Field of Classification Search ........ 248/917–922, 248/176.1, 181.1, 182.1, 276.1, 485, 481, 248/479; 403/90, 55, 24, 114, 115; 361/681–683; 359/876, 840, 481, 844, 855, 864, 872
See application file for complete search history.

(56) References Cited

U.S. PATENT DOCUMENTS

| | | | | |
|---|---|---|---|---|
| 2,615,368 A | * | 10/1952 | Bindley | 248/481 |
| 3,205,777 A | * | 9/1965 | Brenner | 248/480 |
| 3,338,545 A | * | 8/1967 | Magi | 248/481 |
| 4,244,548 A | * | 1/1981 | Sharp | 248/481 |
| 5,436,769 A | * | 7/1995 | Gilbert et al. | 359/874 |
| 6,379,073 B1 | * | 4/2002 | Yoo et al. | 403/90 |
| 6,409,134 B1 | | 6/2002 | Oddsen, Jr. | |
| 6,554,238 B1 | * | 4/2003 | Hibberd | 248/278.1 |
| 6,695,270 B1 | | 2/2004 | Smed | |
| 6,758,454 B2 | | 7/2004 | Smed | |
| 6,857,610 B1 | * | 2/2005 | Conner et al. | 248/284.1 |
| 6,955,437 B1 | * | 10/2005 | Roberts | 359/841 |
| 7,000,878 B2 | * | 2/2006 | Lin | 248/276.1 |
| 7,061,754 B2 | * | 6/2006 | Moscovitch | 361/683 |
| 7,108,384 B1 | * | 9/2006 | Athanassiou et al. | 359/876 |
| 7,210,662 B2 | * | 5/2007 | Liou et al. | 248/282.1 |
| 2005/0199773 A1 | * | 9/2005 | Jung | 248/404 |
| 2007/0018428 A1 | * | 1/2007 | Allen | 280/455.1 |

* cited by examiner

*Primary Examiner*—Amy J. Sterling
(74) *Attorney, Agent, or Firm*—J. Herbert O'Toole; Nexsen Pruet, LLC

(57) ABSTRACT

A mounting arrangement for a flat panel monitor that allows full vertical adjustment and requires minimal space between the flat panel monitor and any surface behind the monitor. A low profile ball and socket tilter minimizing distance between a horizontally rotating turret and the flat monitor while allowing tilt adjustment in two planes. A parallelogram arm attached to the turret control height.

3 Claims, 2 Drawing Sheets

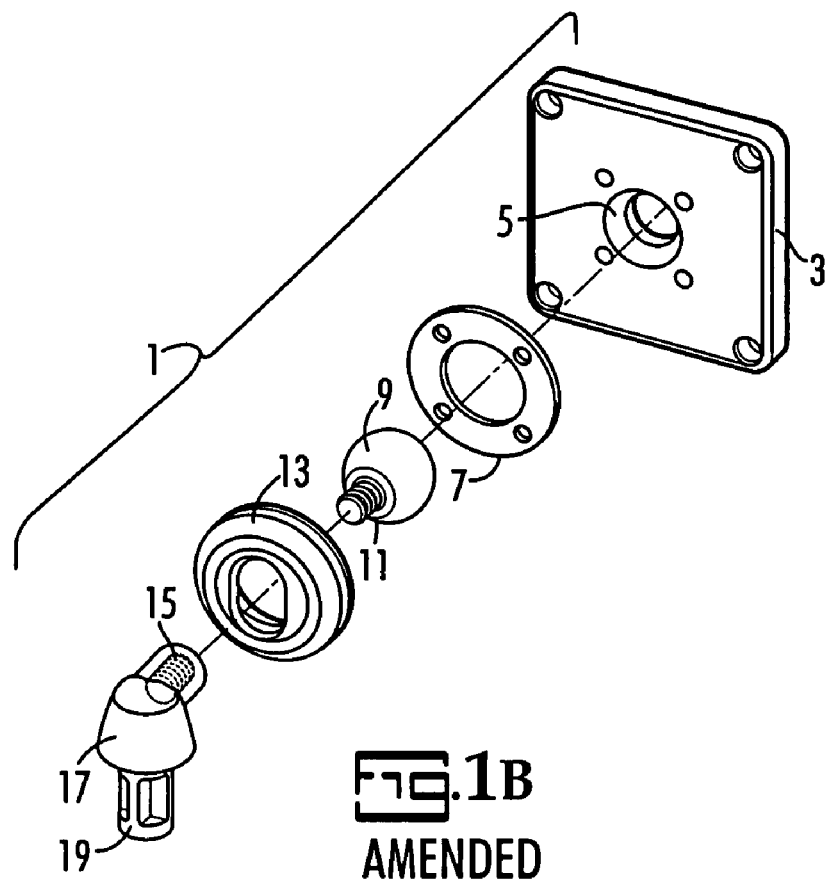
FIG. 1B
AMENDED

FLAT PANEL MONITOR MOUNT WITH LOW PROFILE BALL AND SOCKET SWIVEL AND TILTER MOUNT

FIELD OF THE INVENTION

The invention relates to mounting devices to support flat panel monitor screens (plasma or liquid crystal, hereinafter FPM) at multiple locations relative to the viewer and particularly for alternately changing from high to low position on the work station to accommodate workers sitting and standing during the work day. A low profile ball swivel and tilter provides the needed flexibility in a work space by allowing the FPM to be kept close to a back wall of an office or cubicle.

BACKGROUND OF THE INVENTION

Conventional CRT monitors for office computers are deep, relative to the work surface and their placement determines the arrangement of other equipment in small offices and cubicles. Conventional wisdom has held that the ideal distance should be 18 to 24 inches between screen and viewer.

Arms which provide for support and location of an FPM frequently are based upon parallel arms which are articulated from brackets having multiple hinge pins. A metal or gas spring is employed to hold the FPM in the chosen location. Examples of such arms may be found in U.S. Pat. Nos. 6,695,270 and 6,758,454 to Smed, and U.S. Pat. No. 6,409,134 to Oddsen, Jr. In each reference, a knuckle joint connects the FPM to the support arm. A knuckle joint provides a durable and lockable means to set the screen but has drawbacks. The knuckle joint requires a minimum displacement between the end of the support arm and the FPM and requires a locking mechanism such as a set screw to prevent sagging.

Among the advantages of using the FPM is that the size of a work cubicle can be lessened since the large drop-back of a CRT is no longer an issue. Also, multiple screens in one office become both feasible and desirable. Taking full advantage of these changes requires a mounting system which maximizes the FPM dimensions.

BRIEF DESCRIPTION OF THE INVENTION

It is a first objective of this invention to provide an FPM which minimizes the depth of a work surface required to comfortably view the screen. It is a second objective of this invention to provide a full range of vertical adjustability lateral positioning and tilt capacity to allow persons of different sizes to work comfortably in a seated or standing position. It is a third objective of this invention to provide full vertical adjustment which allows full adjustability without the need for set screws or other loosening and tightening steps.

These and other objectives can be attained by the use of at least one parallelogram arm and a low profile ball swivel/tilter mount. An extension arm may be added between the parallelogram arm and the low profile ball/tilter. The extension arm may be angled so as to avoid interference with said parallelogram arm, and a low profile ball swivel/tilter mount. The system may be mounted on a hub having a turret swivel and first pivot points for a parallelogram. The hub may be mounted on a top surface of a desk or from a wall at the back or side of a work area.

BRIEF DESCRIPTION OF THE DRAWINGS

FIG. 1B is an exploded view of the low profile ball and tilter of FIG. 1A.

DETAILED DESCRIPTION OF THE INVENTION

The reliability and affordability of FPM's enables greater space savings and flexibility in work areas. Early models of FPM display systems such as that disclosed in U.S. Pat. No. 6,695,270 typically included an arm having a fixed length between a swivel attached to a bracket at the end of a parallelogram arm and the swivel and tilter to which the FPM was attached. Typical turret type swivels attached to knuckle type tilters increased the length of the mounting system and enforced a distance from a back wall of a work area such as behind a work desk and the face of the screen.

Figure 1A:
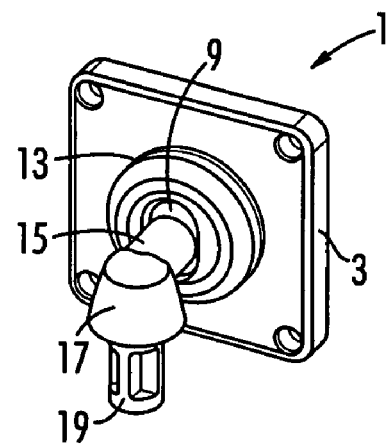
FIG. 1A is a rear perspective view of a low profile ball and tilter.

FIG. 1A illustrates a low profile combination swivel/tilter 1 of this invention. A VESA specification mounting plate 3 carries a ball and socket type tilter joint 9, the ball of which is connected through stub arm 15 to turret 17. The turret is carried on turret shaft 19 at 90° to said stub arm.

FIG. 1B is an exploded view of the low profile combination swivel/tilter 1. An outer half-socket 5 is molded into the back of VESA plate 3. Ball 9 seats into half-socket 5 and held in place by plate 7 which bolts to the back of mounting plate 3. A decorative cover 13 protects the arrangement. Threaded stem 11 threads into a tapped hole 16 in stub arm 15.

The swivel 17 allows the FPM to be rotated freely in the y- axis and the ball joint 5-9 allows the FPM to be tilted in the x- and z- axis in addition to the y-axis.

Figure 2:
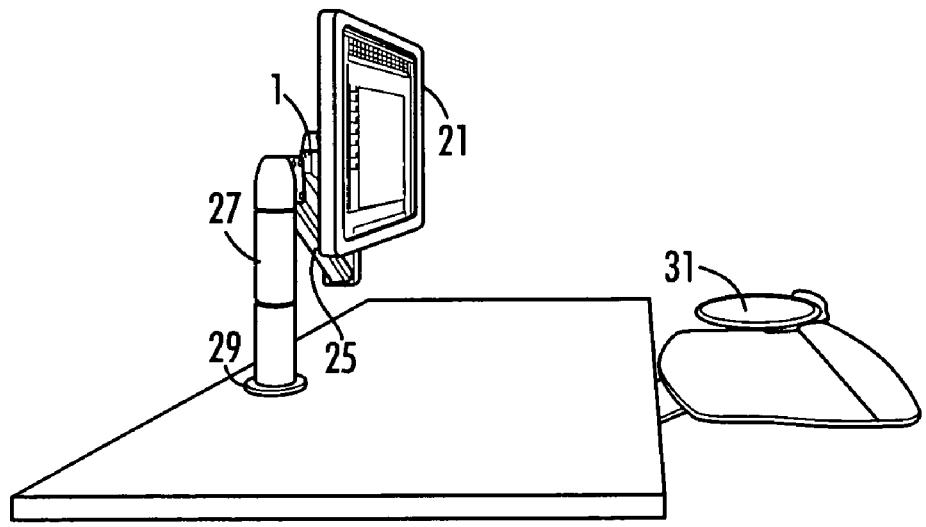
FIG. 2 illustrates the use of a low profile ball and tilter with a mounting stand and a parallelogram arm in the lowered position.
Figure 3:
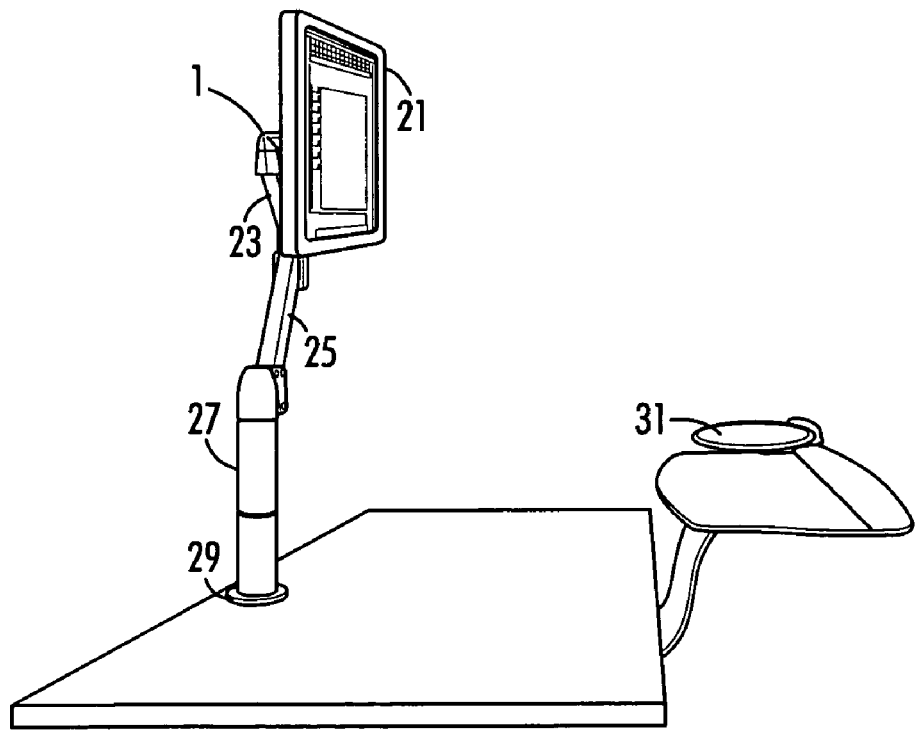
FIG. 3 illustrates the use of a low profile ball and tilter with a mounting stand and a parallelogram arm in the raised position.

FIGS. 2 and 3 illustrate the advantages of the use of the low profile swivel and tilter. A pedestal 27 is mounted on a surface using a fitting means 29. A parallelogram arm 25 allows the swivel and tilter 1 to be moved vertically to raise or lower FPM 21. For proper adjustment, an extension 23 may be used to adjust the FPM height in a preferred embodiment. An adjustable key board support 31 may be used in combination with the FPM support arm of this invention.

With this invention in use, a full range of motion of 14 inches (35.6 cm) may be achieved, allowing most people to be able to focus on the screen while seated or standing with equal comfort, thereby reducing fatigue. The screen may be rotated readily to allow others to view the screen from any available direction.

Varied length hub extensions may be added to permit full range of motion and desired height setting of the monitor. Multiple screens are easily supported from a common pedestal, as illustrated in U.S. Pat. No. 6,695,270

INDUSTRIAL UTILITY

The low profile swivel and tilter mount according to this invention is advantageous in work situation involving use of spread sheets and CAD displays by allowing the user to alternate between sitting and standing and saves space at a worksite.

I claim:

1. A mounting arrangement for a flat panel monitor comprises a mounting plate, a half-socket formed into one side of said mounting plate (3), a ball (9) inserted into said half-socket, a cover (13) protecting and concealing said ball and plate, a plate (7) holding said ball into said ball-socket, a threaded stem (11) projecting from said ball, a turret (17) having a turret shaft (19) and a stub arm (15) arranged in a 90° relationship to said turret and extending from said turret, said stub arm being bored at its end away from said turret and tapped (16) to receive said threaded stem.

2. A monitor arm mounting arrangement comprising:
   a fitting means (29) to attach to a surface;
   a pedestal (27) extending from said fitting means;
   a parallelogram arm (25) having a first hinge bracket attached to said pedestal and a second hinge bracket at an opposite end from said first hinge bracket;
   a turret (17) mounted upon said second hinge bracket through a turret shaft (19);
   a stub arm (15) extending from said turret at 90° to said turret shaft;
   a ball (9) mounted on a threaded shaft, said shaft screwed into said stub arm;
   a ball-socket (5) formed into a plate (3) receiving said ball;
   means (7) to hold said ball into said half-socket; and
   means to attach said monitor arm to said plate.

3. A monitor arm mounting arrangement according to claim 2 further comprising an extension (23) between said second hinge bracket and said turret.

* * * * *